(12) United States Patent
Ford

(10) Patent No.: US 6,810,832 B2
(45) Date of Patent: Nov. 2, 2004

(54) AUTOMATED ANIMAL HOUSE

(75) Inventor: Joe Ford, Cary, IL (US)

(73) Assignee: Kairos, L.L.C., Cary, IL (US)

( * ) Notice: Subject to any disclaimer, the term of this patent is extended or adjusted under 35 U.S.C. 154(b) by 0 days.

(21) Appl. No.: 10/246,819

(22) Filed: Sep. 18, 2002

(65) Prior Publication Data

US 2004/0050338 A1 Mar. 18, 2004

(51) Int. Cl.⁷ ............................................. A01K 31/18
(52) U.S. Cl. ..................... 119/437; 119/436; 119/439; 119/441; 119/448; 119/450; 119/451; 119/447
(58) Field of Search ................................ 119/437, 429, 119/436, 416, 441, 444, 447, 448, 449, 451, 487, 493, 502, 57.2, 534, 432, 525, 677, 479, 526, 458, 456, 455, 505

(56) References Cited

U.S. PATENT DOCUMENTS

| | | | |
|---|---|---|---|
| 470,608 A | 3/1892 | Wardhaugh | |
| 1,895,127 A * | 1/1933 | Jensen | 119/448 |
| 2,604,184 A | 7/1952 | Wardhaugh et al. | 183/7 |
| 2,758,666 A | 8/1956 | Prentiss | 183/7 |
| 2,931,880 A | 4/1960 | Yaffe | 219/19 |
| 2,942,090 A | 6/1960 | Diehl | 219/19 |
| 3,261,324 A * | 7/1966 | Conover | 119/449 |
| 3,343,521 A * | 9/1967 | Moores | 119/515 |
| 3,522,935 A | 8/1970 | Lewis | 261/30 |
| 3,677,229 A * | 7/1972 | Blough et al. | 119/448 |
| 3,687,834 A | 8/1972 | Candor | 204/186 |
| 3,877,240 A | 4/1975 | Eagleson | 119/15 |
| 3,919,976 A * | 11/1975 | Meyer et al. | 119/447 |
| 3,951,336 A * | 4/1976 | Miller et al. | 454/238 |
| 4,060,054 A * | 11/1977 | Blair | 119/447 |
| 4,227,894 A | 10/1980 | Proynoff | 55/126 |
| 4,269,145 A | 5/1981 | Rokhvarg | 119/16 |
| 4,314,527 A * | 2/1982 | Shaw | 119/448 |
| 4,321,887 A | 3/1982 | Martin et al. | 119/22 |
| 4,376,642 A | 3/1983 | Verity | 55/105 |
| 4,380,720 A | 4/1983 | Fleck | 315/111.91 |
| 4,448,150 A | 5/1984 | Catsimpoolas | 119/1 |
| 4,493,289 A * | 1/1985 | Saurenman | 119/437 |
| 4,541,361 A * | 9/1985 | Holter | 119/57.2 |
| 4,574,737 A * | 3/1986 | Bugeja | 119/437 |
| 4,643,745 A | 2/1987 | Sakakibara et al. | 55/137 |
| 4,700,887 A | 10/1987 | Timmons | 236/49 |
| 4,713,724 A | 12/1987 | Voeklel | 361/231 |
| 4,726,814 A | 2/1988 | Weitman | 55/11 |
| 4,773,471 A * | 9/1988 | Grant et al. | 165/60 |
| 4,811,159 A | 3/1989 | Foster, Jr. | 361/231 |
| 5,010,777 A | 4/1991 | Yehl et al. | 73/864.81 |
| 5,036,797 A | 8/1991 | Koozer | 119/21 |
| 5,055,963 A | 10/1991 | Partridge | 361/231 |

(List continued on next page.)

FOREIGN PATENT DOCUMENTS

| | | | | |
|---|---|---|---|---|
| AU | A-61090/90 | | 2/1991 | B03C/3/38 |
| EP | 0294909 | * | 6/1988 | A01K/1/00 |
| EP | 0 558 090 A2 | | 9/1993 | B03C/3/38 |
| GB | 2 117 676 A | | 10/1983 | B03C/3/32 |
| WO | WO-96/11745 | | 4/1996 | B03C/3/00 |

OTHER PUBLICATIONS

Abstract: Japanese Patent No. JP5030875 published Feb. 9, 1993 of Buzen Etsugu Farm: KK, inventor Iwaki Yasunori et al., for Factory Automation System For Windowless Poultry House.

*Primary Examiner*—Peter M. Poon
*Assistant Examiner*—Andrea M. Valenti
(74) *Attorney, Agent, or Firm*—Welsh & Katz, Ltd.; Thomas W. Tolpin

(57) ABSTRACT

An efficient economical automated animal house is provided to increase the health and longevity of animals, such as poultry, and swine. The automated poultry house provides for automatic removal of contaminated bedding and replacement with fresh or recycled bedding. The automated animal house also greatly reduces concentration of dust and noxious gases to provide for a cleaner and healthier environment for the animals and workers.

31 Claims, 5 Drawing Sheets

U.S. PATENT DOCUMENTS

| | | | |
|---|---|---|---|
| 5,064,457 A | 11/1991 | Weber | 55/385.2 |
| 5,099,751 A | 3/1992 | Newman et al. | 454/238 |
| 5,136,980 A * | 8/1992 | Schoeber et al. | 119/448 |
| 5,141,529 A | 8/1992 | Oakley et al. | 55/2 |
| 5,153,811 A | 10/1992 | Rodrigo et al. | 361/231 |
| RE34,346 E | 8/1993 | Foster, Jr. et al. | 361/231 |
| 5,296,018 A | 3/1994 | Suzuki | 95/65 |
| D357,311 S | 4/1995 | Yehl | D23/364 |
| 5,535,089 A | 7/1996 | Ford et al. | 361/231 |
| D373,416 S | 9/1996 | Ford et al. | D23/364 |
| D374,713 S | 10/1996 | Ford et al. | D23/364 |
| 5,784,996 A * | 7/1998 | Krehl | 119/57.92 |
| 5,965,087 A | 10/1999 | Caracciolo, Jr. | 422/28 |
| 6,126,722 A | 10/2000 | Mitchell et al. | 95/57 |
| D434,523 S | 11/2000 | Ford | D26/364 |
| 6,167,317 A | 12/2000 | Meron et al. | 700/32 |
| 6,276,304 B1 * | 8/2001 | Tai | 119/448 |
| 6,325,971 B1 | 12/2001 | Hayes | 422/32 |
| 2002/0007795 A1 | 1/2002 | Pavlak et al. | 119/51.01 |

* cited by examiner

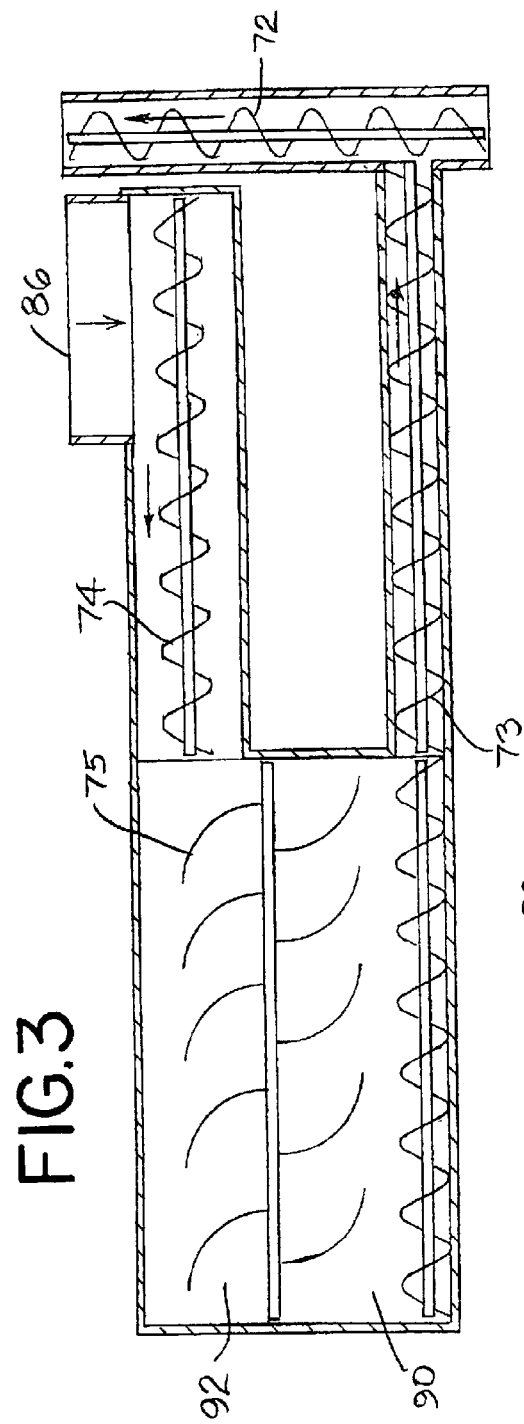
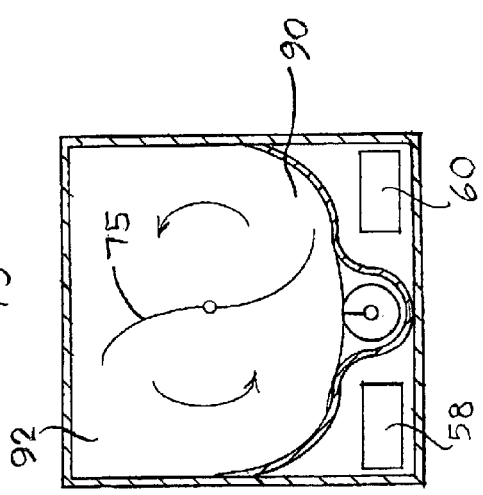
FIG.3
FIG.4

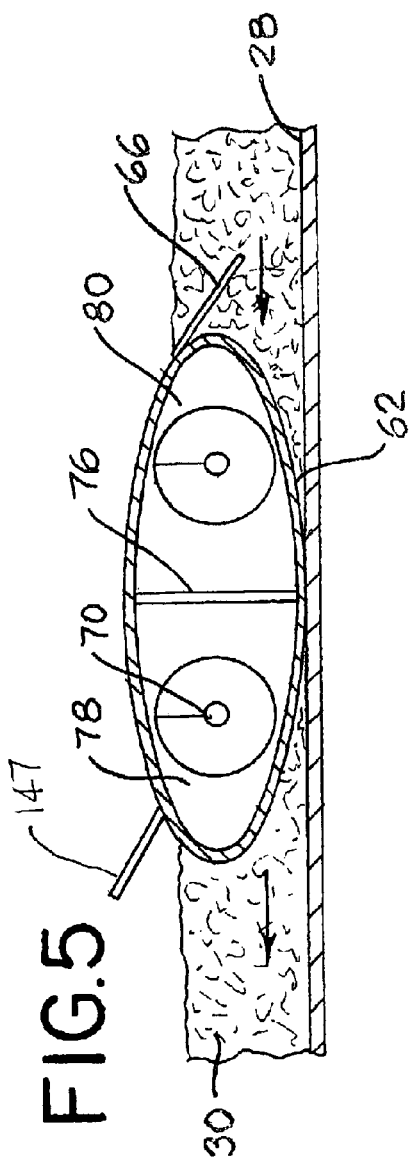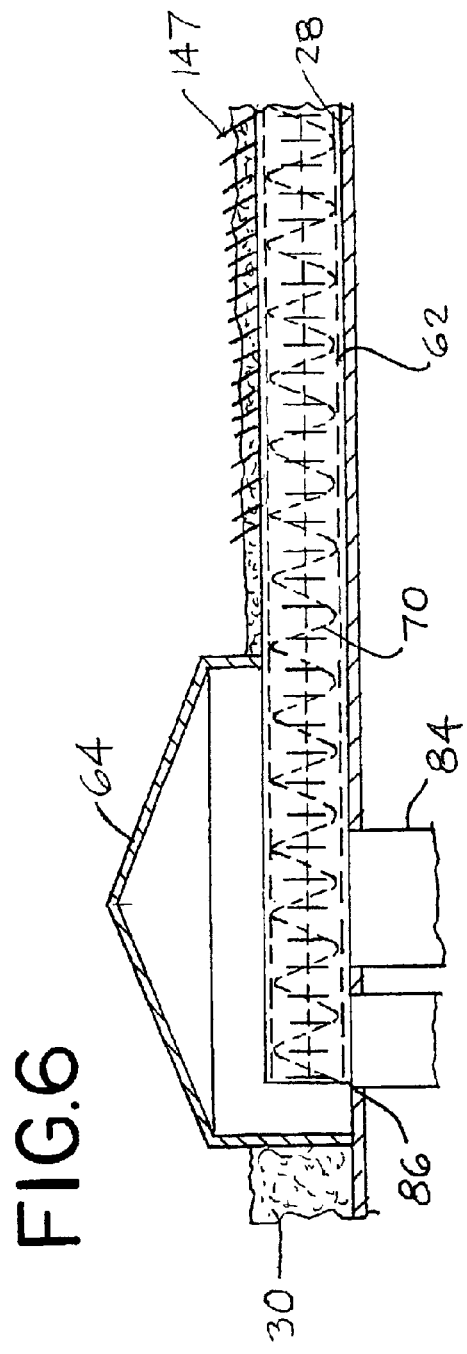

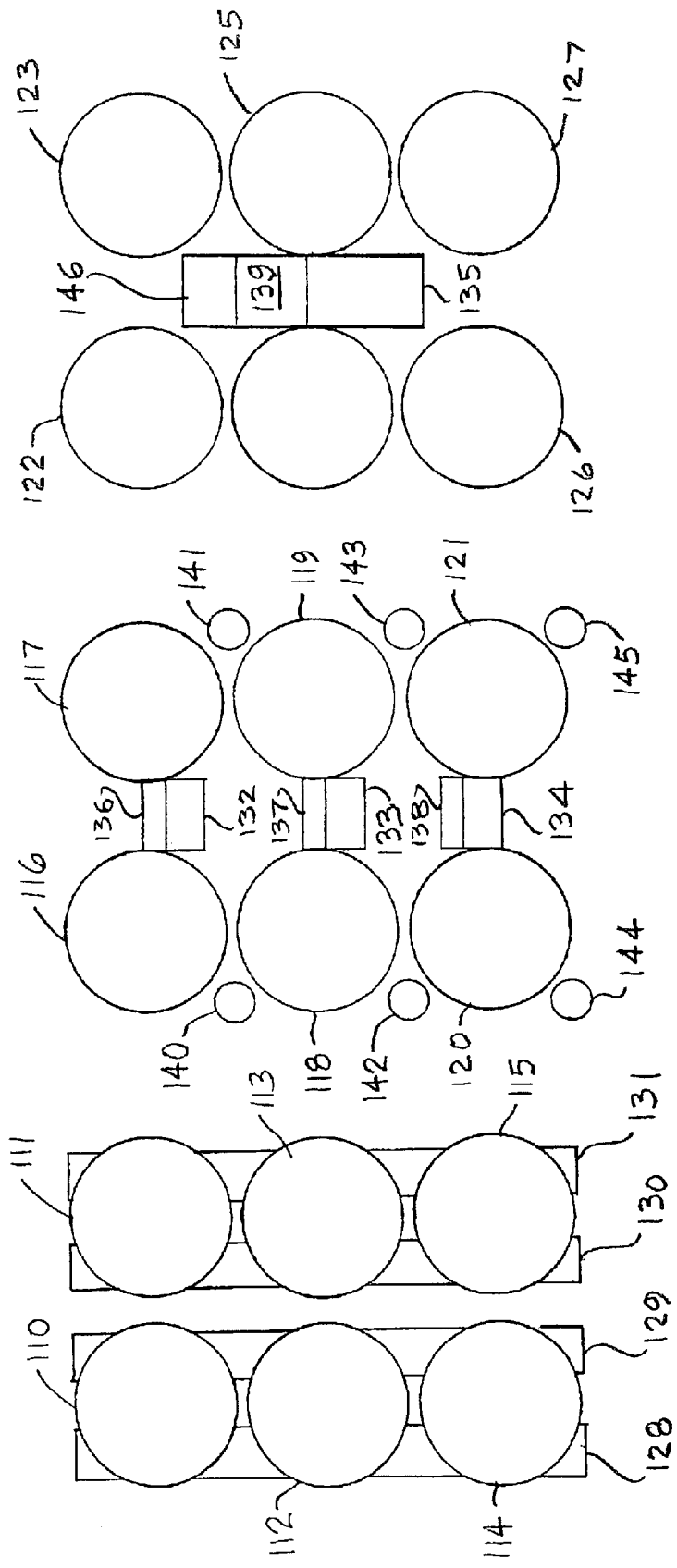

AUTOMATED ANIMAL HOUSE

BACKGROUND OF THE INVENTION

This invention pertains to poultry houses and, more particularly, to automated animal houses.

Workers and livestock, such as poultry and pigs, must endure biohazardous conditions on a daily basis. In poultry (fowl) houses and hog confinements (swine houses), for example, chickens, turkeys, ducks, ostriches, sheep, goats and pigs secrete waste matter, which produces noxious gases comprising volatile fumes of ammonia and methane. Poultry also produce great amounts of dust with their feathers. Swine (pigs and hogs) which like to wallow in mud, also produce great amounts of dust when swine shake off mud. The biohazardous conditions in animal houses create an unsafe atmosphere and an unpleasant environment for poultry (birds), swine, livestock, farmers and workers.

Some poultry houses and hog confinements have an air intake and exhaust system to extract gases and dust for emission into the outside atmosphere. The exhaust fans typically have timed controls or sensors that trigger the fans on and off depending on the level of ammonia and dust in the poultry houses or hog confinements. Even with conventional exhaust fans running at 100% capacity, the farmers and workers often wear protective masks in poultry houses and hog confinements to attempt to shield the gases and dust from their lungs.

The emission and concentration of noxious gases and dust in conventional poultry houses adversely affect the health, growth rate, and well being of livestock, such as chickens, turkeys, and other poultry. Excessive amounts of noxious gases and dust can cause livestock, such as poultry to develop eye diseases. It can also cause the poultry to become sick and lose their appetite. As a result, many of the chickens, turkeys and other poultry stop eating and drinking, their growth rate becomes stunted, and their meat may no longer be tender, firm and tasty. Unsafe levels of these harmful gases and dust can also kill many of the chickens, turkey and other poultry. In conventional poultry houses, the floor is normally covered with a bedding of litter material, such as wood shavings, or rice hulls, etc. which remain in place for long periods of time, e.g. such as a year, before the bedding is changed. During that time, the bedding accumulates fecal matter (waste), urine, bacteria from dead animals, water, spilled feed, etc., which can cause the bedding to become contaminated. Used bedding can be become encrusted with fecal matter and can serve as an incubation area for mold and bacteria. The conditions of the bedding directly affect the quality of the air and living conditions in the poultry house. The preceding conditions can have an adverse affect on the health and longevity of the poultry and swine and the quality of the their meat and eggs.

Another factor affecting air quality in a poultry house is the amount of ammonia and methane produced by the livestock in their fecal matter and the used bedding. High levels of ammonia can also adversely affect the health, growth rate and longevity of the birds up to the point of being fatal.

The production of broilers in the poultry industry includes a grow out stage in which many thousands of young chicks are delivered and sheltered in a poultry house, where they are provided with food and water through a growth cycle of about 6 to 8 weeks. The chicks are not individually caged, but live in a poultry house by the thousands.

A typical poultry house is a rectangular steel truss or wood frame structure. One or more dividers or partitions can be provided along the length of the poultry house to divide the building into sections to restrict the access of the birds. The rectangular building providing the poultry house can be provided with large openings along its length for natural ventilation. For the first three weeks of the chicks' life, the chicks are not usually able to control their own body temperature and are, therefore, very susceptible to changes in temperature within the poultry house.

In order to keep the poultry houses warm, poultry houses are usually equipped with heaters, such as butane heaters. During the first three weeks of growth for a new batch of chickens, the poultry houses are typically kept at a temperature of 90° F. for the first week, 85° F. for the second week, and 80° F. for the third week. For the remainder of the five to seven-week growing cycle, the poultry houses are kept at a comfortable level. With the exhaust fans running at 100% capacity in an attempt to remove some of the noxious gases and dust, the heaters often have to operate continuously in conventional poultry houses to heat the houses to the proper temperature. Continuous operation of the fans and heaters in conventional poultry houses consumes an enormous amount of energy and is very expensive. These expenses are usually and/or ultimately passed on to the consumer.

Many farmers seek improved ways to operate their poultry houses. The U.S. Environmental Protection Agency and State environmental agencies are implementing higher standards for the quality of air exiting the poultry houses, hog confinements and other biohazardous areas.

It is, therefore, desirable to provide an automated animal house, which overcomes most, if not all, of the preceding problems.

BRIEF SUMMARY OF THE INVENTION

A novel automated animal house is provided which improves the health and growth rate of poultry and swine, and enhances the quality of their meat. Advantageously, the improved automated animal house is efficient, effective and economical. Desirably, the user-friendly automated animal house is environmentally attractive and achieves cleaner air for workers and livestock, less pollution, and a decrease of energy and power to exhaust the air, as well as a reduction in butane usage and other sources of energy to heat the animal house.

The automated animal house can comprise an automated poultry or an automated hog confinement and includes a facility to house livestock, such as poultry or swine. Preferably, the facility has an upright annular wall, such as an external vertical circular wall, which extends downwardly from a roof. Desirably, the facility has an upper compartment below the roof, a stationary fixed non-rotating (non-rotatable) animal compartment below the upper compartment, and a lower compartment below the stationary animal compartment. In order to enhance the quality of life and health of the animals, a bed of replaceable bedding material is placed in the animal compartment to support and comfort the animals. An annular feeder can be positioned above the bed to dispense animal feed to the livestock. An annular water line can also be positioned above the bed to dispense water to the livestock.

Ionizers can be provided in the upper compartment to emit ions to help purify the air in the animal house. The animal house can have at least one heater source in the lower compartment to provide heat for the livestock in cold weather. Desirably, the animal house includes at least one fan in the upper compartment to draw heat from the heat source towards the livestock and to blow cooler air on the livestock in warm weather. At least one ozone generator can be provided in the lower compartment to help sanitize the animal house. The automated animal house can include an internal lighting system with DC powered multi-colored high intensity light-emitting diodes (LED's) which require less power consumption and has longer life than the conventional incandescent lighting.

Advantageously, the automated animal house has at least one conveyor with a feed conveyor portion in the lower compartment to feed fresh bedding material to the bed. Desirably, the automated animal house also has at least one conveyor with a discharge conveyor portion in the lower compartment to convey used bedding material away from the bed for discharge to a receptacle or collection bin, preferably outside of the animal house.

In the preferred form, the automated animal house has at least one rotatable (rotating) arm to move the bedding material. The rotatable arm can have tines to loosen fecal encrusted bedding material. In the illustrative embodiment, the rotatable arm comprises a tubular conduit with at least one internal conveyor which communicates with the bed to convey the fresh bedding material and/or used bedding material. The rotatable arm may also have tines located on the top rear side to collect the dead animal carcass as it refurbishes the bedding material.

The automated animal house preferably comprises a set, series, or array of animal houses with substantially upright annular walls, such as vertical circular external walls, to increase the amount of living and growing space for the animals. At least one refurbishing unit can be positioned between and communicate with the animals houses to convey fresh bedding material to the animals houses. At least one recycling unit can also be positioned between and communicate with the animal houses to convey used bedding material from the animal houses. Moreover, at least one feed unit can also be provided to communicate with the animal houses in order to supply animal feed to the livestock in the animal houses. The feed unit can be positioned between or outwardly of the animal houses.

A more detailed explanation of the invention is provided in the following description and claims taken in conjunction with the accompanying drawings.

BRIEF DESCRIPTION OF THE DRAWINGS

FIG. 3 is an enlarged cross-sectional view of conveyors in the lower compartment of the automated animal house;

FIG. 4 is an end view of the conveyors and ozone generators in the lower compartment of the automated animal house;

FIG. 5 is a cross-sectional end view of a rotatable (rotating) arm moving through the bedding in the intermediate compartment;

FIG. 6 is a cross-section front view of the rotatable arm of the automated animal house;

FIG. 7 is a top plan elevational view of one arrangement of automated animal houses in accordance with principles of the present invention;

FIG. 8 is a top plan elevational view of another arrangement of automated animal houses in accordance with principles of the present invention; and FIG. 9 is a top plan elevational view of a further arrangement of automated animal houses in accordance with principles of the present invention.

DETAILED DESCRIPTION OF THE INVENTION

Figure 1:
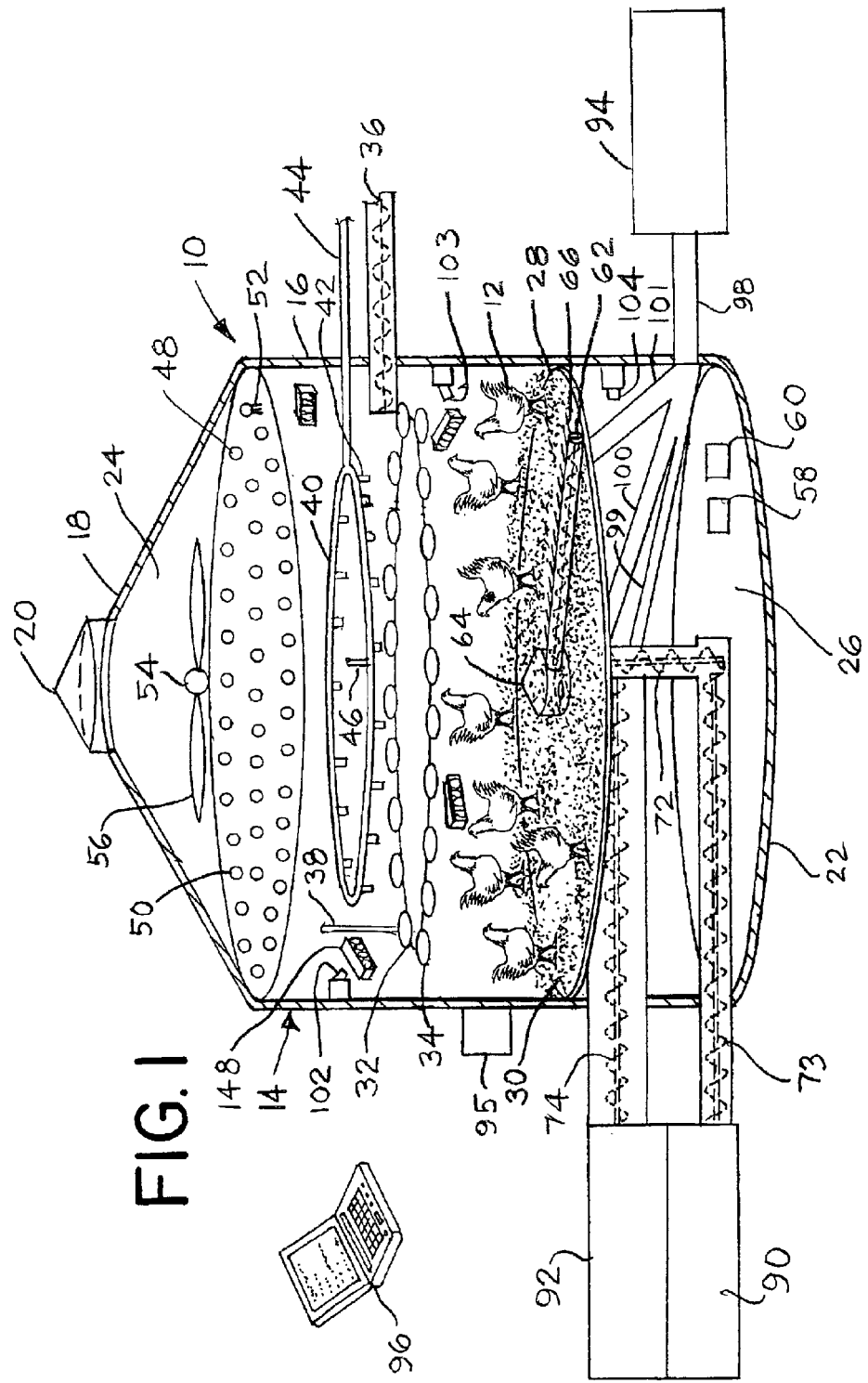
FIG. 1 is a cross-sectional diagrammatic view of an automated animal house in accordance with principles of the present invention.

A detailed description of the preferred embodiments and best modes for practicing the invention are discussed herein.

An automated animal house 10 (FIG. 1) is provided to raise animals 12 (livestock). The animal house can comprise an automated poultry house to raise and house animals, such as poultry (fowl), comprising birds, such as chickens, chicks, hens, roasters, turkeys, ducks, geese, ostriches, swans, etc. The animal house can also comprise an automated livestock to house and raise livestock, such as sheep and goats, or an automated swine house (hog confinement) to house and raise swine, such as pigs and hogs.

The automated animal house provides an environmentally attractive ecological facility 14 (FIG. 1), which comprises a compact animal dwelling to house, the animals. Preferably, the facility has a substantially upright, vertical annular wall 16. The annular wall can be a circular wall, an oval wall, a rounded wall, or a polygonal wall. A roof 18 with an apex 20 extends above and is connected to the annular wall. The roof can comprise a conical roof, a doomed roof, or a polygonal roof. Flooring 22 comprising a basement substructure can extend laterally across a bottom portion of the annular wall. The flooring can extend horizontally or be sloped at a slight angle of inclination.

The automated animal house can have an upper ventilation compartment 24 (FIG. 1) below the roof, a lower heating compartment 26 above the basement flooring, and a fixed stationary non-rotatable (non-rotating) intermediate livestock (animal) compartment or production floor 28 between the upper and lower compartments. The intermediate compartment provides a stationary fixed non-rotating (non-rotatable) animal housing and support to support the animals, e.g. poultry. A removable (replaceable) bed 30 of removable (replaceable) bedding material is positioned in the intermediate compartment (production floor) to support the animals. The bedding material can be comprised of one or more of the following: rice hulls, cork, wood chips, bark, straw, hay, plant material, etc. Other bedding material can also be used.

An annular animal feeder 32 (FIG. 1) can be positioned above the bed of bedding material to dispense animal feed to dispensers 34 in proximity to the animals to feed the animals. Feed can be conveyed to the animal feeder by a feed conveyor 36, such as a screw conveyor or auger. The annular feeder can comprise a moveable annular feeder with a feeder-lifting device 38 to raise and lower the annular feeder. The feeder-lifting device can comprise a mechanism, such as an hydraulic lifting device, a pneumatic lifting device, a motor driven lifting device, a power driven lifting device, and/or one or more cables. The feed dispensers can comprise feed trays, dishes, collection basins, or troughs.

An annular water line 40 (FIG. 1) can be positioned above the bed of bedding material, as well as above the annular feeder, to dispense water to water-containing dispensers 42 in proximity to the animals for the animals to drink (the water). Water in the water lines can be enhanced with vitamins; nutrients and medicine to further improve the health and growth of the animals, i.e. poultry. A water supply line 44 provides a pipe or conduit to supply water to the annular water line. The annular water line can comprise a moveable annular water line with a water line-lifting device 46 to raise and lower the annular water line. The water line-lifting device can comprise a mechanism, such as a hydraulic water line-lifting device, a pneumatic water line-lifting device, a motor driven water line-lifting device, a power driven water line-lifting device, and/or one or more cables. The water-containing dispensers (water dispensers) can comprise nipples, pipes, faucets, trays, dishes, collection basins or troughs.

An array, set or series of interconnected modules 48 (FIG. 1) comprising ionizers 50 are preferably located in the upper compartment below the roof to emit ions to charge particulates of dust and noxious gases in the air in the animal house so as to help purify the air in the animals house. Each of the ionizers can have a set, series or array of ion-emitting needles 52. Preferably, the ionizers comprise self-cleaning ionizers to automatically clean the ion-emitting needles.

A blower system 54 (FIG. 1) comprising or one or more electrically powered fans 56 can be mounted in the upper compartment of the automated animals house to draw heat upwardly from the lower compartment about the animals in the winter. The fans also blow cooler air downwardly on the animals in summer. Advantageously, the fans also circulate ions, ozone and air in the animal house. The fans can draw influent ambient air into the animal house and discharge effluent air out of the animal house.

Ozone generators 58 (FIGS. 1 and 4) can be located in the lower compartment to generate ozone to help reduce and/or eliminate bacteria and sanitize the animal house. The ozone generated by the ozone generators help lower ambient, pathogen concentrations in the poultry house to help reduce the mortality rates and improve feed conversion ratios in the animal house. Heaters 60, such as butane heaters, can be located in the lower compartment to heat the animal house, or in a central location that would allow a greater efficiency to heat more than one house at any given time.

The automated animal houses can have a rotatable (rotating) cleaning arm 62 (FIGS. 1, 2, 5 and 6), which rotates laterally and horizontally through the replaceable bed of bedding material to loosen and help clean the used bedding material. The cleaning arm can be powered and rotated by a motor 64, or, by the rotating auger mechanism. The cleaning arm can have outwardly extending tines 66 to rake the bedding material or pick up and hold the dead carcass. The tines can comprise: rubber tines, plastic tines, flexible tines, and/or resilient tines. The cleaning arm can comprise a radial or a diametric arm. Preferably, the cleaning arm comprises a tubular conduit 68 (FIG. 2) with at least one internal conveyor 70, such as a screw conveyor or auger, which is operably connected to lower conveyors 72–74. The tubular conduit can have a partition 76, such as an upright partitions, which provides a divider. The tubular conduit preferably has at least one feed outlet 78 to dispense fresh bedding material into the bed. The tubular conduit also preferably has an inlet 80 to receive used bedding material from the bed. The tubular conduit of the cleaning arm can also have an intake chamber 82, which communicates a refurbishing chamber 84 in the lower compartment to convey fresh bedding material to the bed. The tubular conduit can further have a discharge chamber 86, which communicates with a recycling chamber 88 in the lower compartment, to convey used bedding material from the bed.

Figure 2:
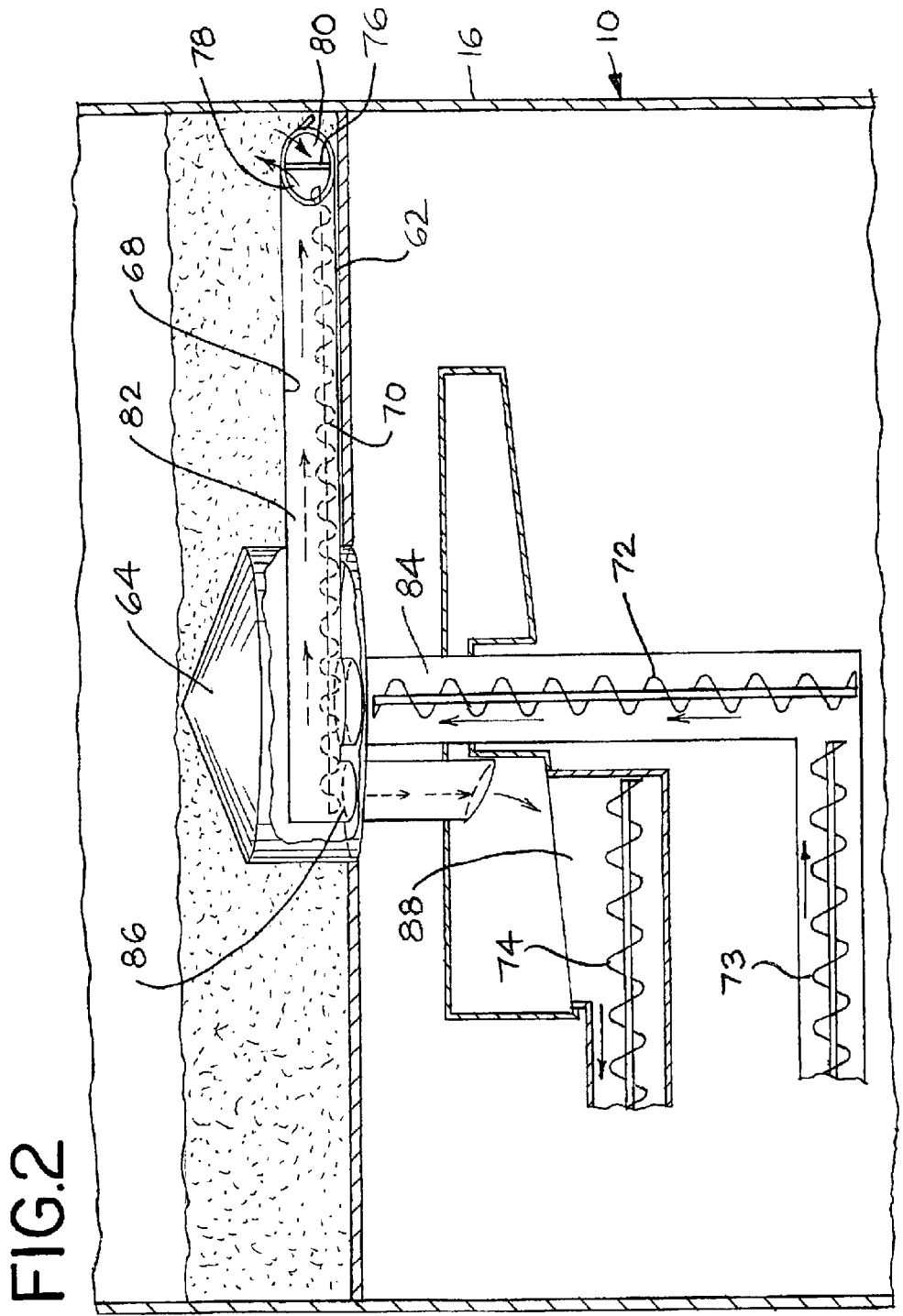
FIG. 2 is an enlarged fragmentary cross-sectional view of the lower compartment of the automated animal house.

The lower conveyor in the lower compartment can comprise screw conveyors or augers. The lower conveyors include feed conveyors 72 and 73 (FIGS. 1 and 2) comprising feed conveyor portions in the refurbishing chamber 92. The feed conveyors convey and feed fresh bedding material to the bed, such as from a fresh bedding material supply bin 90 (FIG. 1). The lower conveyors can also include one or more discharge conveyors 74 which provide discharge conveyor portions into the refurbishing chamber 92 and/or other chambers such as a waste collection bin, disposal receptacle or tank. The withdrawn used bedding material can be recleaned and recycled in the refurbishment chamber, receptacle or elsewhere to provide clean recycled fresh bedding material for the poultry house.

The automated poultry house can be operatively connected to one or more controllers 94 and 96 (FIG. 1). The controller 94 can comprise a heat and airflow controller to automatically regulate and control the flow heat and airflow through the poultry house, such as conduit 98–101. The controller 96 can comprise a central processing unit (CPU), such as a: main frame computer, server, wireless computer, portable computer, lap top computer, palm pilot computer, hand-held computer, personal digital assistant computer, computer chip, cell phone-computer, logic control board or a microprocessor. The controllers can comprise a: (a) an ozone-controller to control the ozone generators; (b) a module-controller to control the modules so as to regulate emission of the ions; (c) a blower-controller to automatically regulate the blower system; (d) a conveyor-controller to automatically control movement of the conveyors; (e) a cleaning-arm controller to automatically regulate rotation of the cleaning arms; (f) a feeder-controller to control the animal feeder; and (g) a water-line controller to regulate dispensing of water to the animals. The controllers can also include one or more cameras 102–104 to visually monitor conditions inside the automated animal house. Cameras 102 and 103 can be located in the intermediate compartment to observe the animals, e.g. poultry, bedding material, and equipment in the intermediate compartment. Camera 104 can be positioned in the lower compartment to observe and monitor the conveyors and equipment in the lower compartment.

One or more of the computer(s) can be positioned inside or outside the poultry house. Cameras, such as three or more cameras can be placed in the poultry house and can be controlled by the poultry house computer. The computer provides monitoring, command, and control capabilities for all of the automated components in the poultry house. The poultry house computer can be part of a network of computer that links each poultry house on a local area network (LAN) or on a wireless local area network (WLAN). The poultry house computer(s) can be accessible to remote computer(s). Each poultry house computer can communicate with a hand-held device using an infrared or wireless connection. The hand-held device can be a cell phone, a personal digital assistant, hand held computer, or other such device.

The rotating cleaning arm is preferably positioned and buried within the bed of bedding material. Sections of the conveyor can be divided so that the front half of the cleaning arm picks up contaminated bedding material while the back half of cleaning arm deposits fresh bedding material. The partition or divider can provide a barrier to separate the pick up and deposit functions of the cleaning arm. After the used bedding material has been raked by the tines of the cleaning arm, the used bedding material can be conveyed to the recycling chamber. In the recycling chamber, the used bedding material can be dried by hot air from the heaters and sanitized by the ozone from the ozone generators. The conveyors in the cleaning arm can provide a duel conveyor system.

The second set of times 147 (FIGS. 5 and 6) located on the top rear side of the cleaning arm can collect and hold the carcass of the dead chickens. This eliminates the need for the grower and workers to walk through the production floor area to gather the dead livestock.

An internal light system 148 (FIG. 1) can comprise high intensity LED's and can be powered by DC voltage.

The automated animal houses can be arranged in a series, set or array of automated animal houses 110–126 (FIGS. 7–9). Each of the automated animal houses can be similar to the automated animal house 10 of FIG. 1. FIG. 7 illustrates that six (6) automated animal houses 110–115 can be placed in the same location as four (4) conventional animal houses 128–131 to provide a substantially increase of housing area, e.g. 50% increase, for housing the animals, e.g. poultry, with a substantial decrease in construction cost. Refurbishing and recycling units 132–134 (FIG. 8) and 135 (FIG. 9) can be positioned between and communicate with the automated animals houses to recycle and refurbish the used bedding material from the automated animal houses and convey fresh and/or recycled bedding material to the beds in the automated animals houses. Heat and air circulation system controller 136–138 (FIG. 8) and 139 (FIG. 9) can be positioned between the automated poultry houses to regulate the flow of heat and air in the automated poultry houses. Animal feed units 140–145 (FIG. 8) and 146 (FIG. 9) provide animal feed chambers to supply animal feed to the livestock, e.g. poultry or swine, in the automated animal houses. In the arrangement of FIG. 8, the feed units 140–145 are positioned outwardly of the automated animal houses. In the arrangement of FIG. 9, the feed unit 146 is positioned between the automated animal houses.

Among the many advantages of the automated animal houses of the this invention are:
1. Outstanding performance.
2. Superior automation of animal houses.
3. Increase land space for raising animals, e.g. poultry and swine.
4. Increased health and longevity of poultry and swine.
5. Better quality animals.
6. Stronger and healthier animals.
7. Improved conditions for animals.
8. Better quality meat.
9. Superior removal of dust.
10. Superb removal of noxious gases.
11. Excellent air purification.
12. Significant decrease of ammonia and methane.
13. Enhanced removal of contaminated bedding material and animal waste, i.e. fecal matter.
14. Healthier environment for people, poultry, swine and other animals.
15. Greater removal of pollutants and containments.
16. Better energy savings.
17. Increased growth rate of poultry and swine.
18. Decrease in deaths of poultry and swine.
19. Less poultry diseases.
20. Enhanced firmness, texture and flavor of poultry.
21. Beneficial to the environment.
22. Better compliance with government environmental regulations.
23. Decrease of dirt and dust.
24. Cleaner growing and working areas.
25. Excellent ammonia reduction.
26. Easy to use.
27. Environmentally attractive.
28. Economical.
29. Dependable.
30. User-friendly.
31. Convenient.
32. Safe.
33. Efficient.
34. Effective.

Although embodiments of this invention have been shown and described, it is to be understood that various modifications and substitutions, as well as rearrangements of parts, components, equipment, structure, and process steps, can be made by those skilled in the art without departing from the novel spirit and scope of this invention.

What is claimed is:

1. An animal house for raising animals, comprising:

a facility comprising a dwelling for housing animals, said facility having a substantially upright annular wall, a roof extending above said annular wall, flooring comprising a substructure extending laterally across a bottom portion of said annular wall, an upper compartment below said roof, a lower compartment above said flooring, and an intermediate compartment providing a fixed non-rotating animal housing for supporting the animals between said upper and lower compartments;

a removable bed of removable bedding material in said intermediate compartment for supporting said animals;

an annular animal feeder above said bedding material for dispensing animal feed to feed dispensers in proximity to said animals;

an annular water line above said bedding material and said annular animal feeder for dispensing water to water dispensers in proximity to said animals;

an array of interconnected modules comprising ionizers in said upper compartment for emitting ions to charge particulates of dust and noxious gases in the air in said animal house so as to help purify the air in the animal house, each of said ionizers having a set of ion-emitting needles;

a blower system comprising electrically powered fans in said upper compartment for drawing heat upwardly from the lower compartment about the animals in winter, for blowing cooler air downwardly on the animals in summer, for circulating ions and air in the animal house, for drawing influent ambient air into the animal house, and for discharging effluent air out of the animal house;

a rotatable cleaning arm for rotating laterally through said bedding material to loosen and help clean said bedding material and hold carcasses of dead animals;

ozone generators in said lower compartment for generating ozone to help eliminate bacteria and sanitize the animal house;

heaters or heat source in said lower compartment for heating the animal house; and at least one lower conveyor in said lower compartment, said conveyor being operatively associated with said cleaning arm, said lower conveyor including a feed conveyor portion in a refurbishing chamber for conveying and feeding fresh or recycled bedding material to said bed, and a discharge conveyor portion in a recycling chamber for conveying and discharging used bedding material from said bed.

2. An animal house in accordance with claim 1 wherein the animal house comprises a poultry house and said animals comprise poultry comprising birds selected from the group consisting of chickens, chicks, hens, roosters, turkeys, ducks, geese, ostriches and swans.

3. An animal house in accordance with claim 1 wherein the animal house comprises a swine house or livestock house and the livestock comprises sheep, goats and swine, said swine selected from the group consisting of pigs and hogs.

4. An animal house in accordance with claim 1 wherein said annular wall is selected from the group consisting of: a circular wall, an oval wall, a rounded wall, and a polygonal wall.

5. An animal house in accordance with claim 1 wherein said roof is selected from the group consisting of a conical roof, a domed roof, and a polygonal roof.

6. An animal house in accordance with claim 1 wherein said bedding material comprises a material selected from the group consisting of: rice hulls, cork, wood chips, bark, straw, hay, plant material, and combinations thereof.

7. An animal house in accordance with claim 1 wherein said annular animal feeder comprises a movable annular animal feeder with a feeder-lifting device for raising and lowering said annular animal feeder.

8. An animal house in accordance with claim 7 wherein:
said feed dispensers are selected from the group consisting of feed trays, dishes, collection basins, and troughs; and
said feeder-lifting device comprising a mechanism selected from the group consisting of a hydraulic lifting device, a pneumatic lifting device, a motor driven lifting device, a power driven lifting device, and at least one cable.

9. An animal house in accordance with claim 1 wherein said annular water line comprises a moveable annular water line with an water line-lifting device for raising and lowering said annular water line.

10. An animal house in accordance with claim 9 wherein:
said water dispensers comprise dispensing apparatus selected from the group consisting of nipples, pipes, faucets, trays, dishes, collection basins, and troughs; and
said water line-lifting device comprising a mechanism selected from the group consisting of a hydraulic lifting device, a pneumatic lifting device, a motor driven lifting device, a power driven lifting device, and at least one cable.

11. An animal house in accordance with claim 1 wherein said noxious gases comprise ammonia and methane.

12. An animal house in accordance with claim 1 wherein said ionizers comprises self-cleaning ionizers for automatically cleaning said ion-emitting needles.

13. An animal house in accordance with claim 1 wherein said rotatable cleaning arm has tines for raking said bedding material.

14. An animal house in accordance with claim 13 wherein said tines are selected from the group consisting of: rubber tines, plastic tines, metal tines, flexible tines and resilient tines.

15. An animal house in accordance with claim 1 wherein said rotatable cleaning arm is selected from the group consisting of a radial arm and a diametric arm.

16. An animal house in accordance with claim 1 wherein said lower conveyor comprises a screw conveyor.

17. An animal house in accordance with claim 1 wherein said used bedding material is conveyed to a waste material receptacle to be recycled for use as compost or potting soil.

18. An animal house in accordance with claim 1 wherein said cleaning arm comprises a tubular conduit with at least one internal conveyor operable connected to said lower conveyor, said tubular conduit defining at least one feed outlet for dispensing fresh or recycled bedding material into said bed, at least one inlet for receiving used bedding material from said bed, an intake chamber in communication with said refurbishing chamber for conveying said fresh bedding material to said bed, and a discharge chamber in communication with said recycling chamber for conveying said used bedding material from said bed.

19. An animal house in accordance with claim 18 wherein said internal conveyor is a screw conveyor.

20. An animal house in accordance with claim 1 including a controller.

21. An animal house in accordance with claim 20 wherein said controller comprises a central processing unit selected from the group consisting of: a mainframe computer, a server, a wireless computer, a portable computer, a laptop computer, a palm pilot computer, a hand-held computer, a personal digital assistant computer, a computer chip, a cell phone-computer, a logic control board, and a microprocessor.

22. An animal house in accordance with claim 20 wherein said controller comprises an ozone-controller for controlling said ozone generators.

23. An animal house in accordance with claim 20 wherein said controller comprises a module-controller for controlling said modules to regulate emission of said ions.

24. An animal house in accordance with claim 20 wherein said controller comprises a blower-controller for automatically regulating said blower system.

25. An animal house in accordance with claim 20 wherein said controller comprises a conveyor-controller for automatically controlling movement of said conveyor.

26. An animal house in accordance with claim 20 wherein said controller comprises a cleaning-arm controller for automatically regulating rotation of said cleaning arm.

27. An animal house in accordance with claim 20 wherein said controller comprises a feeder-controller for controlling said animal feeder.

28. An animal house in accordance with claim 20 wherein said controller comprises a water-line controller for regulating dispensing of water to the animals.

29. An animal house in accordance with claim 20 wherein said controller comprises at least one camera for visually monitoring conditions inside the animal house.

30. An animal house in accordance with claim 1 wherein said rotatable arm has tines for collecting and holding carcass of dead animals.

31. An animal house in accordance with claim 1 including a lighting system with light emitting diodes (LEDs).

* * * * *